July 17, 1962 A. M. STONER 3,044,790
CHUCK AND OPERATING KEY WITH ENLARGED PILOT
Filed Feb. 24, 1959 3 Sheets-Sheet 1
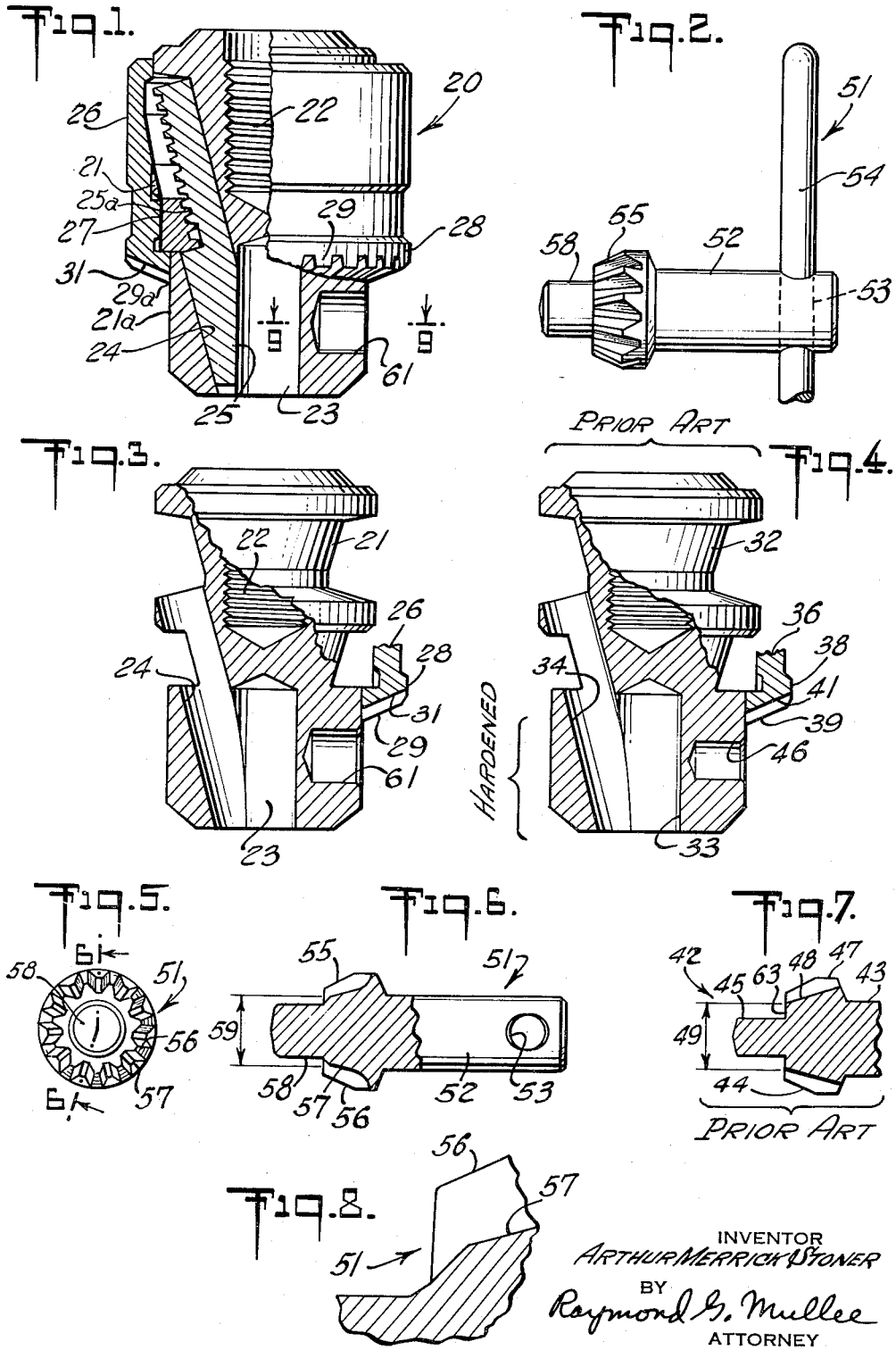

July 17, 1962 A. M. STONER 3,044,790
CHUCK AND OPERATING KEY WITH ENLARGED PILOT
Filed Feb. 24, 1959 3 Sheets-Sheet 2
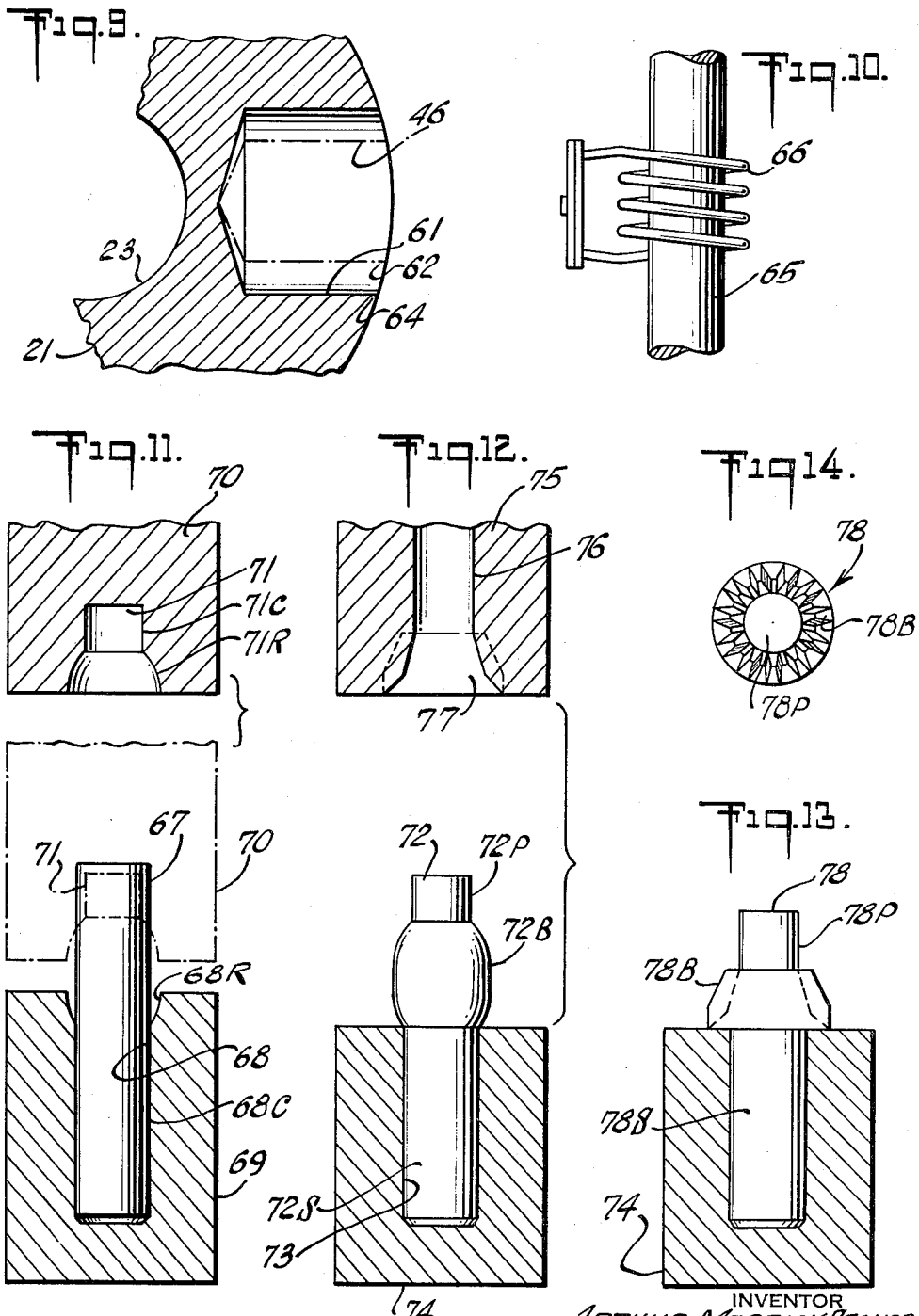
INVENTOR
ARTHUR MERRICK STONER
BY
Raymond G. Mullee
ATTORNEY

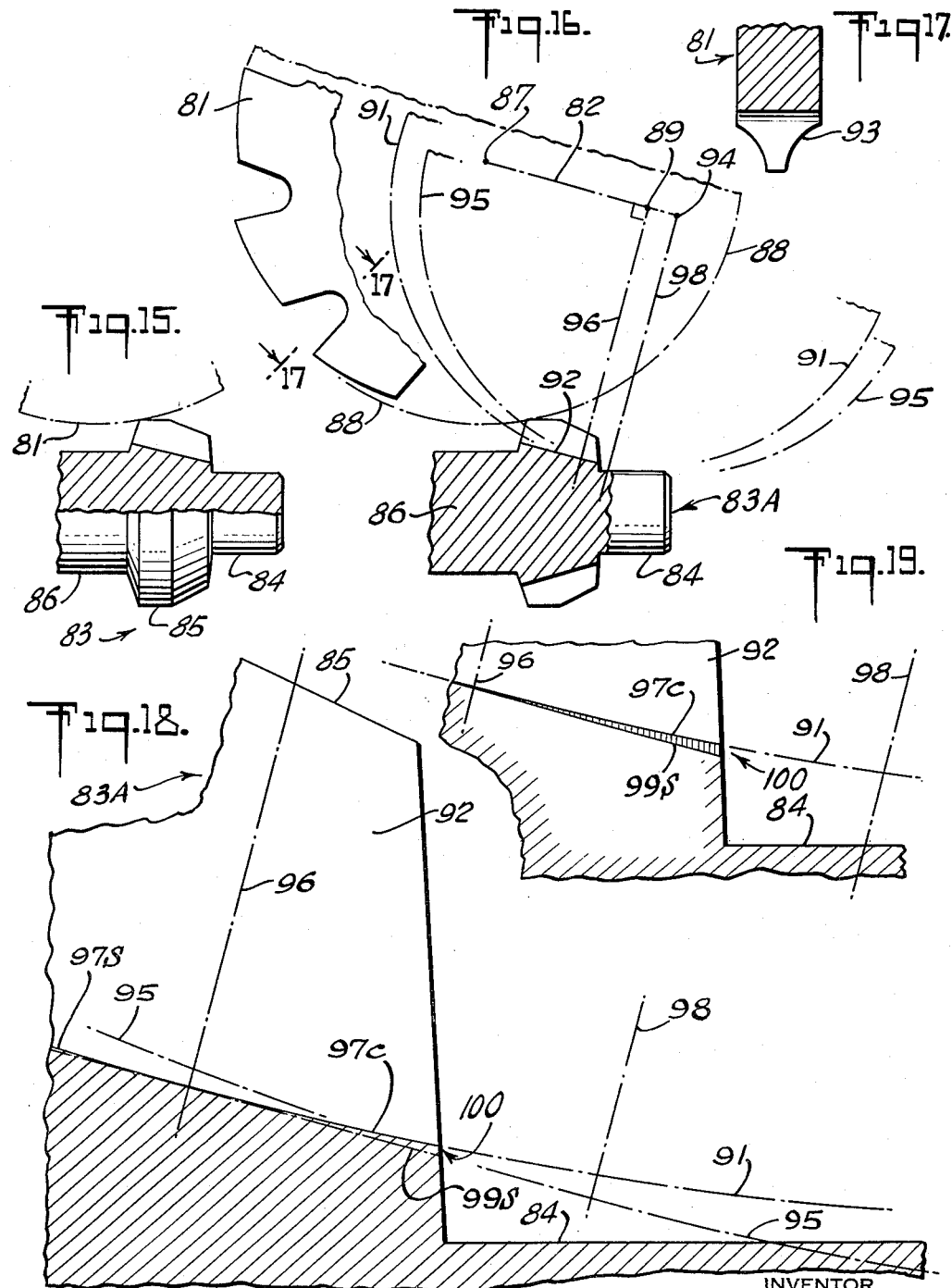

United States Patent Office 3,044,790
Patented July 17, 1962

3,044,790
CHUCK AND OPERATING KEY WITH
ENLARGED PILOT
Arthur M. Stoner, Madison, Conn., assignor to The
Jacobs Manufacturing Company, West Hartford,
Conn., a corporation of New Jersey
Filed Feb. 24, 1959, Ser. No. 795,225
18 Claims. (Cl. 279—61)

This invention relates to key operated chucks of the type which includes a sleeve rotatable on the chuck body for tightening the jaws, the sleeve having a bevel gear driven by a manipulative key, the key having a pilot portion supported for rotation in a radial bore in the chuck body. Chucks of this type have been in extensive use for a very long time and the dimensions and proportions of the key and of the associated chuck structure have not varied appreciably.

Heretofore, it has been the practice to make the chuck body of medium carbon steel, suitable for hardening, and to heat treat the portion adjacent the pilot holes so that the bearing surfaces of such holes will resist wear and deformation. Heat treatment adds greatly to the cost of the chuck body because it requires the use of a more expensive steel and also additional machining operations both before and after the heat treatment. Many attempts have been made to cheapen the cost by eliminating the need for heat treatment but none were successful prior to this invention as the unhardened pilot holes became worn and deformed too quickly.

An object of this invention is to reduce the manufacturing cost of a chuck of the type described without impairing its performance or shortening the useful life of any parts of the chuck.

More specific objects are to reduce the cost of the chuck body by enabling the use of a softer and less expensive steel, by obviating the need for heat treatment, by reducing the number of separate machining operations, and by reducing the wear on the cutting tools used in the manufacture of the chuck body.

The present invention results from the discovery that there is a critical relation between the size and location of the pilot hole on the one hand, and the size and location of the bevel gearing on the other hand, so that when the elements are in the proper ratio, the key may be supported indefinitely in a soft pilot hole without causing objectionable wear or deformation of the pilot holes with the result that the chuck body has a long life which compares favorably with that of the other parts of the chuck.

Another object is to reduce the wear on the pilot hole and the effort required for turning the key. This object is attained by the use of a softer steel for the pilot hole than for the key with a resulting decrease in the coefficient of friction therebetween.

Further objects are to strengthen and prolong the life of the key; and also to cheapen the cost of manufacture of the key.

In accordance with this invention, the pilot and the pilot hole are increased in diameter by about 50% as compared with the sizes which have been standard for over a half century. This change produces unexpected results and fulfills, or helps to attain, the objects above stated. However, it creates a new problem because the keys which are constructed according to this invention are not suited for manufacture by conventional methods. Usually, chuck keys are made on a standard gear cutting machine including a milling cutter that passes through the pinion portion of the key until it lies just outside of and clear of the pilot portion. Increasing the diameter of the pilot to accomplish the above stated objects of this invention would provide interference with the milling cutter of such standard machines.

It is, therefore, necessary to provide a new method of constructing a chuck key which will permit increase of the diameter of the pilot portion which lies adjacent the pinion portion of the key.

One such method involves the use of dies for heading the pinion portion of the key. This method comprises the use of a high frequency induction heater which warms the steel blank to a temperature sufficient to permit the dies to coin or head the pinion to the desired shape, but not sufficient to cause the pinion to warp. Among the advantages of this warm heading method is that it conserves material by obviating the necessity for removing part of the metal of the steel to form the grooves between the bevel teeth.

An alternative method of making the key resides in the use of apparatus common to that of a conventional gear cutting machine, but modified by shortening the stroke of feed of the milling cutter, so that the grooves between the teeth on the pinion portion of the key do not have the full depth of full width at the end which lies adjacent to the pilot.

Other objects will appear more clearly from the description which follows.

In the accompanying drawings.

FIGURE 1 is a view, partly in elevation and partly in longitudinal section, of a chuck embodying this invention;

FIG. 2 is an elevational view of a key embodying this invention and adapted to fit the chuck of FIG. 1, part of the handle of the key being broken away;

FIG. 3 is a view similar to FIG. 1 but showing only the chuck body and a fragmentary portion of the chuck sleeve;

FIG. 4 is a view similar to FIG. 3 but showing the corresponding structure of the prior art;

FIG. 5 is an end view in elevation of the key shown in FIG. 2, the handle being omitted;

FIG. 6 is a side view of the key, part of the view being in longitudinal section taken along the irregular line 6—6 of FIG. 5;

FIG. 7 is a fragmentary view, in longitudinal section, similar to FIG. 6, but showing a portion of a key of the prior art;

FIG. 8 is an enlarged fragmentary view of the chuck key in a section corresponding to the upper part of FIG. 6;

FIG. 9 is an enlarged cross-section of a fragmentary part of the chuck body taken on the line 9—9 of FIG. 1, showing also the pilot hole of the prior art in broken lines;

FIG. 10 is a diagrammatic view of a portion of a continuous length of steel rod passing through an induction heater coil;

FIG. 11 is a longitudinal section of a pair of upsetting dies in operative association with a steel blank, previously cut to a predetermined size;

FIG. 12 is a longitudinal section of a portion of a heading press in operative association with a steel blank previously upset;

FIG. 13 is a longitudinal section of the die portion of the heading press with the steel workpiece after being headed to form a key blank;

FIG. 14 is a plan view of the key blank shown in FIG. 13;

FIG. 15 is a view partly in elevation and partly in longitudinal section of a key blank used in the incomplete cutting method of manufacture;

FIG. 16 is a view of the same key blank after being operated on by the gear cutting machine, showing in full lines a fragmentary part of the milling cutter and showing in broken lines the position of the milling cutter at different stages;

FIG. 17 is a fragmentary cross section of the milling cutter taken along the line 17—17 in FIG. 16;

FIG. 18 is an enlarged longitudinal section of a fragmentary part of the key shown in FIG. 16; and FIG. 19 is an enlarged diagrammatic view showing a sector of the key which lies on the bottom of a groove, the sector representing a portion of the key which is usually removed in the prior art practice, but which remains uncut in the key of this invention.

Referring to FIGS. 1 and 3, the illustrative chuck 20 comprises a body 21 having at its upper end a threaded recess 22 adapted to receive a drill spindle (not shown). At its lower end, the chuck body has an axial bore 23 adapted for the reception of a working implement or drill (not shown). Extending upwardly and outwardly from the axial bore are three inclined bores 24 (one being shown), each bore being adapted for the reception of a jaw 25 slidably mounted for reciprocation therein. Surrounding the chuck body 21 is a sleeve 26. Fixed within the sleeve is a nut 27, the inner surface of which is threaded for engaging complementary threads at 25a on each of the jaws 25.

The sleeve is rotatable on the body 21 but is held against relative axial movement with the result that when the sleeve is turned the jaws move in unison lengthwise of the inclined bores to engage or disengage the drill. The sleeve may be rotated by hand in the preliminary adjustment, but in order to secure the drill firmly within the jaws, a gear arrangement is provided. The gear arrangement comprises a bevel gear 28 integrally formed on the lower end of the sleeve 26, said bevel gear including teeth 29 separated by radial grooves 31, the crests of the teeth and the bottoms of the grooves being inclined downwardly toward the axis of the chuck, the lowermost ends of the teeth being indicated at 29a.

The structure described specifically up to this point is common to the present invention and the prior art. In order to provide a better understanding of the problems which applicant has solved, the prior art will now be described specifically. The prior chuck body 32 (FIG. 4) had an axial bore 33 and a set of inclined bores 34 having the same shape as the bores 23 and 24 respectively in FIG. 3. Body 32 was also arranged to cooperate with a sleeve 36 which was provided at its lower end with a bevel gear 38 having teeth 39 separated by radial grooves 41. The shape, arrangement and function of the prior sleeve 36, including bevel gear 38, teeth 39 and grooves 41, were the same in all material respects as the corresponding elements 26, 28, 29 and 31 of FIGS. 1 and 3. The bevel gear 38 was driven by a manipulative key 42, shown in FIG. 7. The key included a shank portion 43 adapted for attachment to a cross-handle (not shown), a bevel pinion portion 44 adapted to mesh with the bevel gear 38 and a front pilot portion 45 adapted to be inserted in a radial bore 46 in the chuck body 32. The bevel pinion portion 44 included teeth 47 separated by longitudinal grooves 48. The bottom of each groove extended in a straight line, and the grooves were cut by a standard gear cutting machine including a conventional milling cutter rotatable about an axis which was fed in a direction parallel to the bottom of the groove 48. The diameter and length of the pilot portion 45 were selected in such proportions that the milling cutter could pass completely through and beyond the front end of the bevel pinion without interference with the pilot portion. In a popular size of such keys, which have been of standard construction for more than half a century, the diameter of the pilot portion customarily has been about 55% of the root diameter of the bevel pinion, the latter diameter being indicated by the reference numeral 49 in FIG. 7.

The original chucks of the type shown in FIGS. 4 and 7 did not have long wearing properties because the pilot holes or radial bores 46 in the chuck body 43 became deformed in use and wore out long before the other parts of the chuck. To solve this problem, it became the practice to harden the pilot holes by using a steel having a relatively high carbon content and by heat treating the lower or nose end of the body. This method greatly increased the cost of making the chuck body by requiring additional machining and grinding operations both before and after the heat treatment. However, this method has been in use for over a third of a century because all attempts, prior to this invention, to save the additional expense were unsuccessful.

Reverting now to the present invention, the key and associated body have been modified to overcome the problem of wear on pilot holes and at the same time to obviate the use of hard steel and heat treatment in the manufacture of chuck bodies. This invention is the result of a discovery that there is a critical relation between the diameter of the pilot hole in the chuck body and the size of the bevel gears, and that when these elements are in their proper relation, a hardened key may be used in a chuck body made of mild steel without causing objectionable wear or deformation of the pilot hole. In the embodiment of invention shown in FIGS. 2, 5, 6 and 8, the key 51 comprises a shank portion 52 provided near its rear end with a diametrical hole 53 adapted for the reception of a cross-handle 54. In front of the shank portion the key has a bevel pinion portion 55 adapted to mesh with the bevel gear 28. The pinion includes teeth 56 separated by longitudinal grooves 57. In front of the pinion portion 55 and extending integral therewith is a pilot portion 58.

In accordance with this invention, the diameter of the pilot is increased greatly in relation to the standard practice of the prior art. In the embodiment of FIG. 6, the diameter of the pilot is equal to about 85% of the root diameter 59 of the bevel pinion 55. Satisfactory results may be obtained, however, by using a ratio as low as 75%. The enlarged pilot 58 fits within an enlarged radial bore or pilot hole 61 in a lower portion 21a of the chuck body 21. Preferably, there are three such pilot holes disposed intermediate the inclined bores 24 which receive the jaws 25. Each of the enlarged pilot holes 61 has an axis lying in a plane which is spaced from the bevel gear 29 and from the lower end of the chuck body by the same distance as in the prior art. However, the uppermost portion of the enlarged pilot hole 61 lies closely adjacent the bevel teeth 29 on sleeve 26, whereas the standard size pilot hole 46 in the prior art is separated from the bevel teeth 39 by a substantial distance.

FIG. 9 shows, on an enlarged scale, how the large diameter pilot hole of this invention (in full lines) compares with the standard pilot hole of the prior art (in broken lines). The large hole 61, as stated previously, has the unexpected and remarkable property of resisting wear and deformation notwithstanding the use of a much softer metal for the chuck body than for the key. The precise reasons why such wear resistant properties should result are not known. One possible explanation may be that the outer edge of the standard pilot hole 46, which edge is designated 62 in FIG. 9, is subject to abrasion and spalling by contact with the radial face 63 (FIG. 7) at the front end of the standard pinion 55, whereas the corresponding edge 64 of the enlarged pilot hole 61 is more widely spaced from the front face of the bevel pinion, at least along the portion of the edge 64 which otherwise would be subjected to the greatest wear.

Another possible explanation is that the large pilot hole 61 lies closely adjacent the bevel gear teeth 29 at the nearest point whereas the standard pilot hole 46 is widely spaced from the bevel gear teeth 39 at the nearest point. A third possible explanation may be that the wear on the pilot hole is distributed over a larger area than previously, but this explanation is dubious because the results obtained by this invention are disproportionate to those which may be expected from the increase in bearing area alone.

In a commercial embodiment of this invention, the chuck body is made of a low carbon steel having a carbon content of about 0.13% and known as B 1113 according to the designation given by the American Iron and Steel Institute. The chuck body is not hardened or heat treated at the pilot hole or elsewhere. Such steel would not have withstood the wearing action of the hardened key if the parts were proportioned according to the standard practice of the prior art for over a half century. For that reason, the standard chuck body prior to this invention was usually made of a medium carbon steel and was heat treated to harden the nose portion of the body including the pilot holes. One of the steels which is suited for such heat treatment and which has been used with considerable success is a medium carbon steel known as AISI C 1144.

The advantages which this invention has attained by eliminating the need for heat treatment of the chuck body include the following:

(1) Distortion from heat treatment is eliminated so that the parts of the chuck can be fitted more accurately and with a lower manufacturing cost inasmuch as wider dimensional tolerances are now permitted for obtaining the same degree of accuracy.

(2) In the manufacture of the chuck body, oxidation from heat treatment is eliminated and there is no longer any need for grinding the heat treated surfaces to remove the discoloration caused by such oxidation.

(3) The usual grinding operations on the body of the chuck have all been eliminated and instead the surfaces which were formerly ground are now finished in the automatic machine at the same time that it performs other operations such as drilling and reaming.

(4) It is now feasible to use softer steels in the manufacture of the chuck body as compared with standard practice. This advantage results from the fact that the steel may have a low carbon content whereas in the conventional method of making a chuck body it is necessary to select a steel having a relatively high carbon content in order to enable the nose end to be hardened.

By substituting a mild steel for a relatively hard steel, the invention results in additional advantages as follows:

(5) The coefficient of friction between the soft steel bearing area of the pilot hole and the hardened key is considerably less than it was previously between two surfaces of equal hardness with the result that there is now a corresponding increase in efficiency and a reduction in the physical effort required in turning the key.

(6) The raw material or stock from which the chuck body is made is less expensive as compared with the steel formerly considered necessary.

(7) The steel is easier to machine as compared with the steel used in the conventional process which was relatively tough throughout the chuck body even before the nose was heat treated.

(8) It is now possible to combine several steps of machining operation into one. For example, the fabrication of the axial bore 33, inclined bores 34 and pilot holes 46, by drilling, reaming, washing, burning, etc., heretofore was performed in five distinct steps using conventional materials and methods. Equivalent operations on the corresponding bores 23, 24 and 61 may now be performed simultaneously as part of a single step of an automatic machine.

(9) There is a substantial reduction in the cost of tools, as longer runs can be made before the tools need resharpening or replacement.

(10) There is a faster production from a given amount of machinery with a resulting saving in capital investment, depreciation and labor.

Summarizing the advantages attained by this invention, the number of operations required for making the chuck body has been reduced from 20, in the case of the prior art device of FIG. 4, to only 8 in the case of the present invention shown in FIG. 3. The cost of the raw steel stock for the chuck body has been reduced by at least 20%. The total manufacturing cost of the entire chuck has been reduced about 15%.

The above advantages have been attained by this invention without any corresponding disadvantages except possibly the following: The key 51 is so proportioned that it is not suited for manufacture by conventional methods. The reason is that the diameter of the pilot portion 58 (FIG. 6) is so large in relation to the root diameter 59 that the pilot projects within the path normally followed by the milling cutter in forming the grooves 57 between the teeth 56 on the bevel pinion 55. This invention therefore creates the need for alternative methods of forming the teeth on the key.

One such method, which may be described as the warm-heading method, is illustrated in FIGS. 10–14. In its original state, the raw stock consists of a continuous length of steel rod 65 (FIG. 10) having a diameter corresponding to that of the shank portion 52 of the key 51 (FIGS. 2 and 6). The rod is composed of a medium carbon steel, suitable for hardening, for example AISI #4037. Rod 65 passes through a coil 66 forming part of a high frequency induction heater arranged to warm the steel rod to a temperature of about 600 degrees F. The warm rod is then cut into blanks of the desired length, by well known means (not shown). The key blank 67, as shown in FIG. 11, is considerably longer than the finished key 51 (FIG. 6) but its volume or mass does not materially exceed that of the main part of the key (without handle 54 or hole 53) as there is very little metal wasted or removed either during the warm heading process or in the finishing operations which follow.

Key blank 67, still warm, is placed in a cavity 68 in lower die 69. Cavity 68 comprises a cylindrical portion 68C having a length and diameter conforming to that of the shank portion 52 of the finished key 51 (FIG. 6) and to the diameter of the steel rod 65. Above the cylindrical portion, the cavity comprises a recessed portion 68R. The latter is concave and has the shape of the portion of an egg or a zone of an ellipsoid of revolution. Cooperating with the lower die 69 is an upper die having a cavity 71. Upper die cavity 71 comprises a cylindrical portion 71C having a diameter conforming to that of the pilot portion 58 of the finished key 51, but a length somewhat less than that of pilot portion 58. Below the cylindrical portion 71C, the cavity has a concave recessed portion 71R, of a shape similar to that of the lower concave recess 68R. The upper die 70 is lowered into contact with the key blank 67 until the latter is seated and in the upper cylindrical bore 71C and centralized in both bores. Thereupon, the dies are forced together with a pressure of several tons by any suitable means such as a toggle or hydraulic arrangement, not shown. This application of pressure between the dies causes upsetting of metal of the key blank 67 into the concave recesses 68R and 71R and at the same time extrusion of metal into the cavity 71C for the partial forming of the key pilot. The final position of the upper die 70 is shown in dot-dash lines in FIG. 11. The key blank 72 after being upset by the dies of FIG. 11 has the shape shown in FIG. 12, including an upper pilot portion 72P; a lower shank portion 72S and an intermediate bulb portion 72B. The upset key blank 72, while still warm, is then inserted into the cavity 73 of the lower die 74 of the heading press, the cavity being a cylindrical bore conforming in size to the shank portion 72S. Cooperating with the lower die 74 is a punch 75. The punch has a central bore 76 adapted to fit the pilot portion 72P. At the mouth of the bore 76, the punch has a bevel tooth recess 77, complementary in shape to the toothed portion 55, 56, 57 on the finished key 51 (FIGS. 5 and 6). That is to say, the toothed recess comprises teeth adapted to fit the grooves 57 and grooves adapted to receive the teeth 56. The punch 75 is lowered until the bore 76 receives the pilot portion 72P and the toothed recess 77 rests on top of the bulb portion 72B of the key blank. Thereupon, pressure is applied to upset the bulbed portion and extrude the metal therein to cause it to flow into the spaces of the toothed recess 77. The force between the dies is applied as a steady pressure developing gradually until it reaches a force of several tons which is sufficient to cause coining of the metal into the shape of a pinion. During the coining operation and subsequent thereto, some of the metal in the bulb 72B is extruded upwardly into the punch bore 76 with the result that the shank portion 72P is lengthened. The punch is then withdrawn from the die leaving a completed key 78 which is shown in FIGS. 13 and 14. The completed key has a pilot portion 78P somewhat longer than the corresponding portion 72P of blank 72, a shank portion 78S conforming in dimensions with the shank portion 72S, and a bevel pinion portion 78B. The latter has a shape conforming substantially with that of bevel pinion portion 55 (FIGS. 5 and 6), and requires very little machining. The key 78 is hardened by heat treating it in a well-known manner.

An important feature of the warm heading process shown in FIGS. 10–13, resides in the use of the induction heater 66. With such a heater the temperature of the rod 65 may be controlled. It has been found that a temperature of 600 degrees F. is satisfactory for forming keys which have a configuration adapted to fit the chuck 20 of FIG. 1 and which are therefore unsuited for manufacture by conventional methods. By moving the key blank quickly from one step to the next, the temperature of the blank is maintained through the final heading operation. The heat developed during the upsetting of the bulb 72B offsets the tendency of the blank to cool. The punch 75 and the dies 74, 69 and 70 have a relatively long life as they encounter less resistance from the blank than they would if the blank were cold headed. If desired, the rod 65 could be heated by other means, such as a gas flame (not shown).

The warm heading method has an advantage over the hot forging method in that it does not cause warping of the key.

An advantage of the warm heading method over conventional gear cutting methods is that it permits the pilot portion 72P or 78P of the key to be increased in diameter. This not only reduces the wear on the chuck body 21 as previously described, but also strengthens the pilot portion of the key and makes it less susceptible to misalignment and wear.

Another advantage over gear cutting methods is that it avoids waste of material which was formerly caused by removing metal, for example, by milling the grooves 57 between the teeth 56.

A further advantage of the warm heading method is that it strengthens the tooth formation because it causes the grain fibers of the steel to shift their positions gradually to accommodate themselves to the shape of the finished pinion. The shifting or realignment of the grain fibres occurs in two states, during the swelling to form the bulb 72B and during the coining or heading to form the pinion portion 78B. The fibres are not disrupted at any time as they would be in the use of a gear cutting machine. The warming of the steel facilitates the flow of the grain fibres and enables them to adjust their positions with minimum strains and with the result that the key has great strength and resistance to fatigue failure.

Another method of forming a chuck key having the same general proportions as the key 51 is shown in FIGS. 15–19 and may be designated for convenience as the incomplete cutting method. This method may be practiced with a conventional gear cutting machine having a milling cutter 81 arranged to rotate about its own axis while the axis is gradually shifted or fed along the inclined line 82. The key blank 83, before it is loaded into the machine, has the shape illustrated in FIG. 15 and includes a pilot portion 84, a head portion 85, and a shank portion 86.

The head portion is defined by smooth frusto-conical surfaces which are continuous in the original condition of the blank. Parts of said surfaces are cut away during the grooving operation and the remainder of such surfaces define the edges and ends of the teeth in the completed key. The key blank 83 is supported in fixed position in the machine while the rotating cutter is fed to the right and downward, with its axis following the path of line 82. The cutter makes contact initially with the key blank when its axis reaches the point 87 on line 82 (FIG. 16), at which time the periphery of the cutter is moving in a path of a circle 88 (FIGS. 15 and 16). The rotating cutter is fed progressively along the line 82 until its axis arrives at the point 89. The point 89, which represents the end of the front stroke of the cutter is the center of the circle 91 (FIGS. 16 and 18) representing the final position of the periphery of the cutter. During the relatively short stroke of the cutter from the position of first contact (axis 87, circle 88) to the position of final contact (axis 89, circle 91), the cutter 81 mills a groove 92 in the head portion 85 of the key blank 83, which in its grooved condition will be referred to hereafter as key blank (or key) 83A. The sides of groove 92, for most of its length, conform to the contour of the cutting portion 93 (FIG. 17) of the cutter. The bottom of the groove 92, for the greater part of its length, lies in a line which is parallel to the inclined line 82. When the cutter axis reaches the end of its (short) stroke at point 89, the feeding movement of the cutter is reversed and the axis moves to the left along line 82 at least as far as the point 87 and preferably beyond it. Thereupon, the key blank 83A is indexed or turned about its own axis to a new position, and the cutter is moved forward to cut a new groove.

According to a novel feature of this method, the forward stroke of the milling cutter is terminated before it has completed the movement heretofore considered necessary for cutting a bevel pinion. Such termination occurs at a time when the cutter is still in cutting engagement with the key blank 83A, whereas in the prior art practice the forward stroke of the cutter was not considered complete until it had passed completely through the head portion of the blank and moved for some distance beyond the blank while out of contact with it. In the prior art practice, the cutter started its operation as described in connection with this invention, but the forward feed of the cutter continued for a full stroke until the cutter axis and periphery attained the position indicated by point 94 and circle 95 respectively. That practice is unsuited for the manufacture of keys having the proportions of the present invention because the diameter of the pilot would provide interference with the cutter in its final position 95 as clearly indicated in FIG. 18.

In order to compare the effect of the shortening of the cutter stroke on the shape of the pinion, reference is made to the radial line 96 representing the final position of the cutter according to this invention, and extending from the point 89 in a direction at right angles to the line 82. The bottom of the groove 92, as a result of this invention, is made up of two portions—a straight line portion 97S lying to the left of radial line 96, and a curved portion 97C lying to the right of line 96. The curvature of portion 97C conforms with the circle 91. To the left of the radial line 96, the sides of the groove 92 are spaced apart by the full distance and conform in contour with the shape of the cutting portion 93 (FIG. 17) of the cutter as they do in the prior art. To the right of the line 96 the sides of the groove 92 differ from those of the prior art because groove 92 is reduced in depth (as well as in altitude) as it progresses towards the right end of the head portion 85. In the prior art method, the radial line 98 which represents the position of the cutter at the end of its long stroke, lies entirely to the right of the head portion 85 and spaced from said head to provide clearance and manufacturing tolerance. The bottom of the prior art groove is a straight line from one end of the pinion to the other and includes a portion 99S which lines up with the portion 97S and which, if extended, would be tangent to the circle 95. The space between the straight line 99S and the arc 97C represents a triangular portion 100 (FIGS. 18 and 19) of the pinion which is left uncut in the present invention and which might have been removed from the pinion portion of the key, according to the prior art method of cutting. That method, as explained previously, would not have been possible unless the pilot portion were reduced as it was in the prior art. On the other hand, the incomplete cutting method permits the use of a pinion having a diameter sufficient to attain the results of this invention. For example, the incompletely cut key 83A of FIGS. 16 and 18 has a ratio of pilot diameter to root diameter approximating 85 percent as in the case of the warm-headed key of FIGS. 5–8 and 10–14.

It might be expected that the uncut triangular portion 100 at the bottom of groove 92, and the narrowed sides of the groove just above the portion 100 would cause clashing between the key 83A and the bevel gear 28. However, extensive tests made with such keys 83A have failed to reveal any deleterious effects from the incomplete cutting of the groove.

The foregoing description includes two alternative methods for making keys having dimensions adapted to fit the chuck of FIGS. 1 and 3. Other methods are available, for example, precision metal casting and powdered metal fabrication.

The warm heading method of manufacturing the key, which is illustrated in FIGS. 10–14, is claimed in a divisional application Serial No. 177,803, filed March 6, 1962. The incomplete cutting method of manufacture, which is illustrated in FIGS. 15–19, is claimed in a divisional application Serial No. 177,879, filed March 6, 1962.

What is claimed is:

1. A key operated chuck comprising a body composed of relatively low carbon steel, a sleeve mounted for rotation on said body but held against axial movement, said sleeve being composed of relatively tough steel as compared with the body, jaw means supported in said body and movable to open and closed positions in response to rotary movement of the sleeve, a bevel gear on the lower end of the sleeve, said bevel gear being hardened by heat treatment, and a radial bore in the chuck body lying closely adjacent to the bevel gear, said bore being adapted to provide a bearing for a hardened key meshing with the bevel gear, the portion of the body surrounding said bearing being relatively soft and therefore having relatively less resistance to wear as compared with the bevel gear and hardened key, the bevel gear having straight teeth separated by radial grooves, the edges of the teeth extending downwardly and inwardly to form the elements of a frustum of a cone, the radial bore having a diameter of sufficient size and depth to extend beyond the path of the lines formed by projecting the elements of the cone frustum.

2. In combination, a chuck and a key for operating said chuck, the chuck comprising, a body, a jaw actuating a sleeve mounted for rotation on the body and having a bevel gear on its lower end, a pilot hole in the chuck body adjacent the bevel gear, the key having a pilot rotatably mounted in the pilot hole and having a bevel pinion meshing with the bevel gear, the bevel pinion having longitudinal teeth separated by longitudinal grooves, the bottoms of the grooves converging toward and intersecting the pilot and the pilot hole, the portion of the body surrounding the wall of the pilot hole being of softer metal than the key and bevel gear, and the diameter of the pilot and pilot hole being at least 75 percent of the root diameter of the pinion.

3. In combination a chuck and a key for operating the chuck according to claim 2, the bevel gear and the key being composed of medium carbon steel and being hardened by heat treatment, the chuck body being composed of a relatively low carbon steel having less strength than the steel in the key.

4. In combination a chuck and a key according to claim 2, the crest of each tooth on the bevel gear being substantially straight, and the bottom of the mating groove on the bevel pinion being partly straight and partly concave.

5. A chuck key comprising a cylindrical pilot portion at the front end, a bevel pinion portion adjacent the pilot portion, and a shank portion adjacent the bevel pinion portion, the bevel pinion portion having longitudinally extending teeth separated by grooves, the bottoms of the grooves extending from the rear end of the pinion portion and converging forwardly and each terminating at a point which lies closely adjacent to the pilot portion, the diameter of the pilot portion being at least 75 percent as large as the root diameter of the teeth as defined by said grooves.

6. A one piece chuck key structure comprising a cylindrical pilot portion at the front end, a bevel pinion portion adjacent the pilot portion, and a shank portion adjacent the bevel pinion portion, the bevel pinion portion having longitudinally extending teeth separated by grooves, the bottoms of the grooves extending from the rear end of the pinion portion and converging forwardly, the bottom of each groove having at least a portion thereof extending in a straight line projecting toward the pilot portion, the pilot portion having a diameter sufficiently large to intersect the projected path of the straight lines defining the bottoms of the grooves.

7. A one-piece structure for a chuck key comprising a cylindrical pilot at the front end of the key, a bevel pinion adjacent the pilot and a shank rearward of the pinion, the pinion having longitudinal teeth separated by longitudinal grooves, each groove extending in a plane coinciding with the axis of the key, the bottom edge of each groove including a straight line portion extending forwardly and inwardly from the rear end of the pinion, and also including a concave arcuate portion extending to the front end of the pinion, the arcuate portion being tangent to the straight line portion.

8. A one-piece structure for a chuck key according to claim 7 in which the straight line portions are so directed that if extended they would intersect the pilot, but the arcuate portions form parts of circles which lie entirely outside the pilot, thereby permitting use of a milling cutter to form the arcuate portions without interference with the pilot.

9. A chuck operable by a key of a type having a pilot end and a bevel pinion adjacent to the latter; said chuck comprising a body, a jaw actuating sleeve mounted for rotation on the body, a portion of the body depending below the sleeve, a radial bore in the depending body portion adapted for reception of the pilot end of said key, and a bevel gear about the lower end of the sleeve having teeth the longitudinal edges of which slant downwardly to the depending body portion, the radial bore having an internal wall providing a bearing surface for the pilot end of said key received therein, said bearing surface being surrounded by a body portion having a hardness relatively less than that of the pilot end of the key, and the radial bore having a diameter equal at least to 75% of the root diameter of the beveled pinion of the key.

10. A chuck according to claim 9, wherein the bevel gear is composed of medium carbon steel hardened by heat treatment, and the body of the chuck is composed of unhardened relatively low carbon steel uniformly soft throughout and not heat treated.

11. A chuck according to claim 9, wherein the crest of each tooth on the bevel gear is substantially straight, and the crests of those teeth overhanging the radial bore having a line of projection intersecting the latter.

12. In a key operated chuck including a body composed of unhardened low carbon steel, jaw means in the body movable to open and closed positions, and a sleeve threadedly engaged upon the jaw means and rotatable relative thereto on the body to effect movement of the jaw means to open or closed position accordingly as the sleeve is rotated in one direction or the other; means for accommodating a chuck key for effecting rotation of the sleeve of a type having a pilot end and an adjacent beveled pinion and composed of medium carbon steel hardened by heat treatment, said accommodating means comprising an extension of the body below the sleeve, a radial bore in the extended body portion adapted for reception of the pilot end of the key and having a diameter equal at least to 75 percent of the root diameter of the pinion of the said key, and a bevel gear about the lower end of the sleeve having teeth adapted for meshed engagement by the beveled pinion of the said key and having a hardness substantially equal to that of the key, and a projection of the crests of those teeth of the bevel gear overhanging the radial bore intersecting the radial bore and the pilot end of the key when the pilot end is received in the bore.

13. A chuck and key combination composing a cylindrical body, a jaw actuating sleeve mounted for rotation on the body and having a bevel gear at its lower, end, a radial bore in the body below the bevel gear, and a key for rotatably actuating the bevel gear having a pilot end removably received in the radial bore and having a pinion drivingly engaged with the bevel gear; wherein the radial bore has a diameter equal to at least 75% of the root diameter of the pinion of the key, and the wall of the radial bore has a lesser degree of strength than that of the pilot end of the key.

14. A chuck and key combination comprising a cylindrical body, a jaw actuating sleeve mounted for rotation on the body and having at its lower end a bevel gear the teeth of which slant towards the peripheral surface of the body, a radial bore in the body below the bevel gear, and a key for rotatably actuating the bevel gear having a pilot end removably received in the radial bore and having a pinion drivingly engaged with the bevel gear; wherein the radial bore has a diameter equal to at least 75% of the root diameter of the pinion key, the crests of the teeth of the bevel gear overhanging the radial bore have a line of projection intersecting the radial bore and the pilot received therein, and wherein the body is composed of a metal having a lesser degree of strength than that of the metal forming the pilot of the key.

15. In a chuck having a cylindrical body and a jaw actuating sleeve mounted for rotation on the body, the sleeve having at its lower end a bevel gear the teeth of which slant downwardly to the peripheral surface of the body, the improvement comprising a radial bore in the body below the bevel gear for receiving the pilot end of a key having a pinion for drivingly engaging the bevel gear, the length and diameter of the bore being substantially equal, the radius of the bore being substantially greater than the distance from the bore to the lowermost edge of the bevel gear, the diameter and length of the bore being such and the bore being so located that a line projection of the crests of the teeth of the bevel gear intersects the radial bore.

16. In a chuck having a cylindrical body, and a jaw actuating sleeve mounted for rotation on the body, the sleeve having at its lower end a bevel gear actuable by the pinion of a pinion type key for rotating the sleeve; the improvement comprising a radial bore in the body below the bevel gear having a diameter sufficient to admit with a slide fit the pilot end of a pinion type key the pilot of which is equal to at least 75% of the root diameter of the pinion of the key.

17. In a chuck having a cylindrical body, and a jaw actuating sleeve mounted for rotation on the body, the sleeve having at its lower end a bevel gear actuable by the pinion of a pinion type key for rotating the sleeve; the improvement comprising a radial bore in the body below the bevel gear having a distance to the gear which is less than the radius of the bore, and having a diameter adapted to accommodate with a slide fit the pilot of a pinion type key the diameter of which pilot approximates the root diameter of the pinion, and the pinion of which is operatively engageable with the gear.

18. In the combination of a chuck, and a key for operating the chuck wherein the chuck has a body and a jaw actuating sleeve mounted for rotation thereon, and wherein the key includes a cylindrical pilot portion and a bevel pinion portion adjacent the pilot portion, the bevel pinion portion having longitudinally extending teeth separated by grooves, the bottoms of the grooves extending from the rear end of the pinion portion and converging forwardly and each terminating at a point which lies closely adjacent to the pilot portion the diameter of the pilot portion being at least 75 percent as large as the root diameter of the teeth as defined by said grooves; a radial bore in the body of the chuck complementing the dimensions of the pilot portion of the key, and a bevel gear at the lower end of the sleeve above the radial bore having teeth and grooves between the teeth respectively complementing the teeth and grooves of the pinion portion of the key.

References Cited in the file of this patent

UNITED STATES PATENTS

| | | |
|---|---|---|
| 1,526,328 | Englund | Feb. 17, 1925 |
| 1,854,825 | Connell | Apr. 19, 1932 |
| 1,894,515 | Hubbell | Jan. 17, 1933 |
| 2,105,618 | Silva | Jan. 18, 1938 |
| 2,387,339 | Meyer | Oct. 23, 1945 |
| 2,621,054 | Kasimir | Dec. 9, 1952 |
| 2,880,008 | Stoner | Mar. 31, 1959 |